(12) United States Patent
Inoue

(10) Patent No.: US 6,925,087 B2
(45) Date of Patent: Aug. 2, 2005

(54) PACKET TRANSFER SCHEME USING MOBILE TERMINAL AND ROUTER FOR PREVENTING ATTACKS USING GLOBAL ADDRESS

(75) Inventor: Atsushi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 862 days.

(21) Appl. No.: 09/951,451

(22) Filed: Sep. 14, 2001

(65) Prior Publication Data

US 2002/0031135 A1 Mar. 14, 2002

(30) Foreign Application Priority Data

Sep. 14, 2000 (JP) ..................................... P2000-280831

(51) Int. Cl.[7] .............................................. H04L 12/58
(52) U.S. Cl. ....................... 370/401; 370/338; 370/392; 370/466; 455/433
(58) Field of Search ................................ 370/352, 466, 370/338, 392, 401, 356, 389; 455/433; 709/238, 230

(56) References Cited

U.S. PATENT DOCUMENTS

| | | | |
|---|---|---|---|
| 5,745,695 A | | 4/1998 | Gilchrist et al. |
| 6,014,379 A | * | 1/2000 | White et al. ................ 370/389 |
| 6,404,754 B1 | * | 6/2002 | Lim ........................... 370/338 |
| 2002/0026525 A1 | * | 2/2002 | Armitage .................... 709/238 |
| 2005/0047348 A1 | * | 3/2005 | Suzuki et al. ............... 370/252 |

FOREIGN PATENT DOCUMENTS

| | | |
|---|---|---|
| JP | 6-261043 | 9/1994 |
| WO | WO 98/33130 | 7/1998 |
| WO | WO 99/33291 | 7/1999 |

OTHER PUBLICATIONS

Soh Kaijima, "World of illegal instrusion Detection Np. 2: Points about Selection of Network Intrusion Detection System", Interop Magazine, vol. 10, No. 10, Aug. 25, 2000, pp. 140–143 (with partial English translation).

K. Palmer, et al., Motorola Technical Developments, vol. 35, XP–000862601, pp. 20–21, "Flow Control Integration in Lapi Established State", Jun. 1998.

* cited by examiner

*Primary Examiner*—Duc Ho
(74) *Attorney, Agent, or Firm*—Oblon, Spivak, McClelland, Maier & Neustadt, P.C.

(57) ABSTRACT

In a mobile communication network providing an Internet service, the arrived packets are delivered from the nearest neighbor router device to the mobile terminal device according to the need such as when a prescribed application is activated or when a prescribed packet has arrived, by using message exchanges between the nearest neighbor router device and the mobile terminal device, so that it becomes possible to prevent the unnecessary packet attacks from the global Internet.

24 Claims, 10 Drawing Sheets

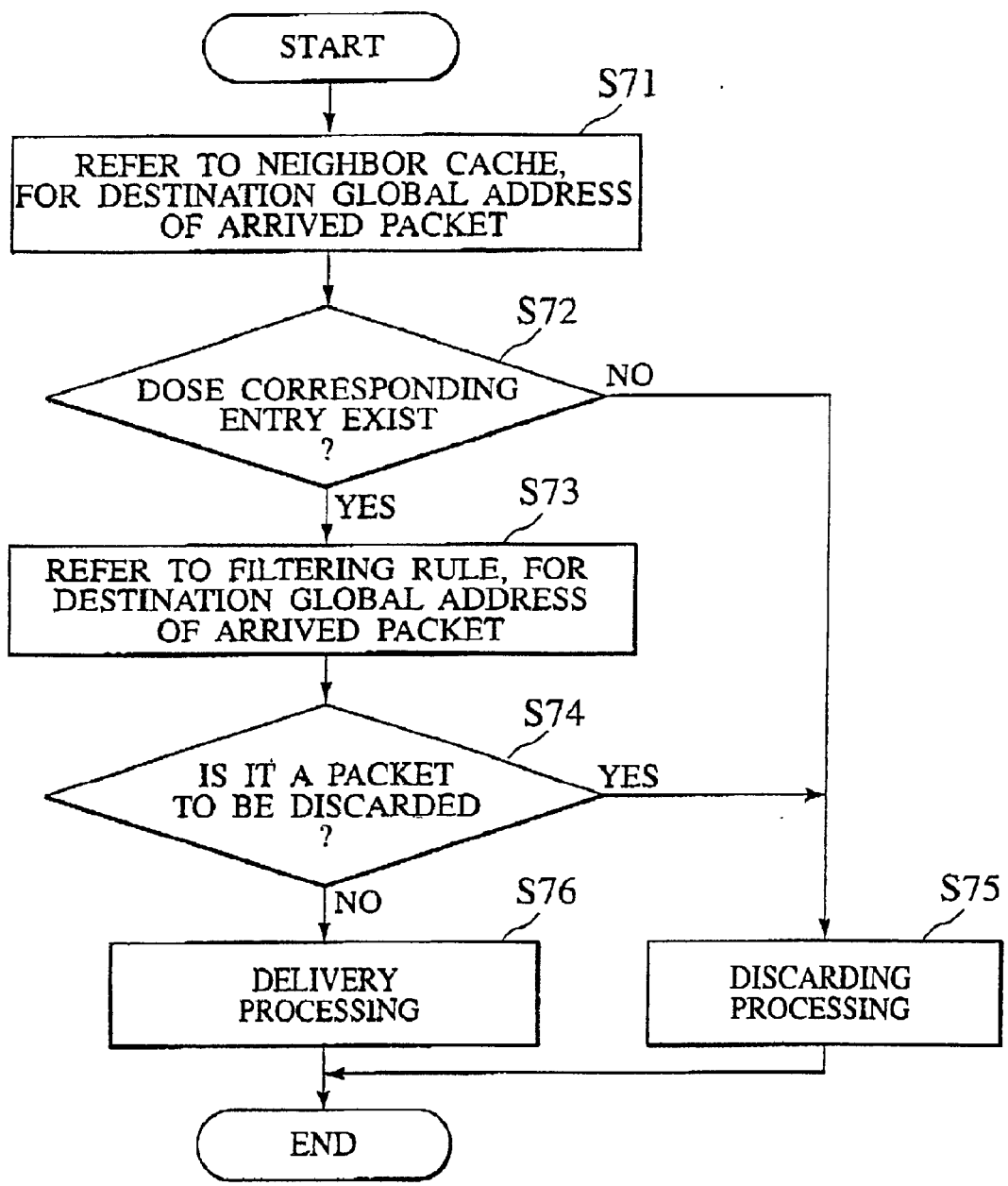

PACKET TRANSFER SCHEME USING MOBILE TERMINAL AND ROUTER FOR PREVENTING ATTACKS USING GLOBAL ADDRESS

BACKGROUND OF THE INVENTION

1. Field of the Invention

The present invention relates to a mobile communication device for carrying out communications while moving among a plurality of interconnected networks such as mobile telephone network, Internet, locally connected device network, and a router device provided in a mobile communication network for providing the Internet service.

2. Description of the Related Art

In conjunction with the rapid spread of portable telephones and the Internet, the Internet service using a portable telephone as a terminal has been developed by the mobile carriers. This is a service in which a module for processing a communication protocol called TCP/IP used in the Internet is provided in the portable telephone so as to enable WWW servile, e-mail delivery, still/video image transfer, etc. This service has an advantage in that it becomes possible to freely access not just information closed within the communication service provider but also various information available on the Internet that is spreading worldwide, and for this reason the number of users of this service is increasing rapidly.

Now, the portable telephone Internet service that has an enormous number of users encounters a serious problem regarding how to assign addresses to terminals. Currently, the Internet faces with the problem of IP address shortage in view of the ever increasing number of nodes (routers and terminals), and in the current IPv4, it has been customary to use an address system called private address that is closed within an organization for accesses in an enterprise network or the like and to use global addresses only for accesses to the external of the organization by utilizing the address conversion. Similarly, in the case of the portable telephone Internet service, it is currently customary to use the private address within the cellular phone network by providing an address conversion device (NAT: Network Address Translator) at a border between the IP packet network of the portable telephone company and the global Internet.

On the other hand, the next generation IP specification called IPv6 is currently under the discussion. The IPv6 can accommodate far more nodes compared with the IPv4 by expanding the IP address from a 32 bits width as used in the IPv4 to a 128 bits width. Similarly, in the case of the portable telephone Internet service, it is possible to assign unique global addresses to all terminals by adopting the IPv6. In this way, communications using a seamless end-to-end connection that does not require a relay device such as NAT on the communication path can be realized by using a wide address space, and it is expected to be advantageous in many aspects including the security and the communication quality guarantee.

The IPv6 has various advantages as described above, but from a viewpoint of operating the actual portable telephone Internet, for example, always assigning a global address to each terminal can cause a problem. Namely, when a global address is assigned to a terminal, this terminal becomes accessible from all nodes on the Internet so that this terminal can potentially be a target of attacks such as that for sending a large amount of unnecessary packets, for example.

However, a provision of providing a packet filter or a firewall on a route in order to prevent such attacks is not preferable because it goes against the essence of the IPv6 that transparent end-to-end communications are possible. Also, a more passive provision of not registering a name of a terminal to a name server in order to prevent attacks from the external does not provide a full solution to the problem because the number of applications that require the resolution of a name of a terminal itself such as VoIP is increasing.

BRIEF SUMMARY OF THE INVENTION

It is therefore an object of the present invention to provide a packet transfer scheme using a mobile terminal device and a router device, in which each mobile terminal device can carry out transparent end-to-end communications with arbitrary node on the Internet by using a global address of the IPv6 in full compliance with the IPv6 system and policy, while realizing a function for preventing attacks such as that of packet transmission to a global address.

According to one aspect of the present invention there is provided a packet transfer method, comprising: generating a global address that is unique on Internet at a mobile terminal device, the global address being an address which should be used by the mobile terminal device in utilizing an Internet service provided by a mobile communication network to which the mobile terminal device is connected, according to a message received from a nearest neighbor router device in the mobile communication network; notifying a first message indicating a start of a utilization of the Internet service using the global address, from the mobile terminal device to the nearest neighbor router device at a time of starting the utilization of the Internet service using the global address; delivering arrived packets destined to the global address of the mobile terminal device from the nearest neighbor router device to the mobile terminal device upon receiving the first message at the nearest neighbor router device; notifying a second message indicating an end of the utilization of the Internet service using the global address from the mobile terminal device to the nearest neighbor router device at a time of ending the utilization of the Internet service using the global address; and discarding arrived packets destined to the global address of the mobile terminal device at the nearest neighbor router device upon receiving the second message at the nearest neighbor router device.

According to another aspect of the present invention there is provided a packet transfer method, comprising: generating a global address that is unique on Internet at a mobile terminal device, the global address being an address which should be used by the mobile terminal device in utilizing an Internet service provided by a mobile communication network to which the mobile terminal device is connected, according to a message received from a nearest neighbor router device in the mobile communication network; notifying a first message indicating a start of a utilization of the Internet service using the global address, from the mobile terminal device to the nearest neighbor router device at a time of starting the utilization of the Internet service using the global address: delivering arrived packets destined to the global address of the mobile terminal device from the nearest neighbor router device to the mobile terminal device upon receiving the first message at the nearest neighbor router device; notifying a second message from the mobile terminal device to the nearest neighbor router device, when delivery to the mobile terminal device of a specific packet that is destined to the global address of the mobile terminal device and that has been delivered from the nearest neighbor router device is not desired, the second message indicating a desire for not receiving the delivery of the specific packet to the mobile terminal device and a prescribed condition to be satisfied by the specific packet; and discarding the specific packet that satisfies the prescribed condition indicated by the second message among arrived packets destined to the global address of the mobile terminal device at the nearest neighbor router device after receiving the second message from the mobile terminal device at the nearest neighbor router device.

According to another aspect of the present invention there is provided a mobile terminal device, comprising: a communication interface configured to make access to a mobile communication network; an address setting unit configured to set up a global address that is unique on Internet and that should be used by the mobile terminal device in packet communications utilizing an Internet service provided by the mobile communication network, according to a message received from a nearest neighbor router device in the mobile communication network; and a packet communication unit configured to carry out the packet communications utilizing the Internet service, notify a first message indicating a start of a utilization of the Internet service using the global address to the nearest neighbor router device at a time of starting the utilization of the Internet service using the global address, and notify a second message indicating an end of the utilization of the Internet service using the global address to the nearest neighbor router device at a time of ending the utilization of the Internet service using the global address.

According to another aspect of the present invention there is provided a mobile terminal device, comprising: a communication interface configured to make access to a mobile communication network; an address setting unit configured to set up a global address that is unique on Internet and that should be used by the mobile terminal device in packet communications utilizing an Internet service provided by the mobile communication network, according to a message received from a nearest neighbor router device in the mobile communication network; and a packet communication unit configured to carry out the packet communications utilizing the Internet service, notify a first message indicating a start of a utilization of the Internet service using the global address to the nearest neighbor router device at a time of starting the utilization of the Internet service using the global address, and notify a second message to the nearest neighbor router device, when delivery to the mobile terminal device of a specific packet that is destined to the global address of the mobile terminal device and that has been delivered from the nearest neighbor router device is not desired, the second message indicating a desire for not receiving the delivery of the specific packet to the mobile terminal device and a prescribed condition to be satisfied by the specific packet.

According to another aspect of the present invention there is provided a router device provided in a mobile communication network providing an Internet service, the router device comprising: a message processing unit configured to transmit a router message to be used in assigning a global address that is unique on Internet with respect to a mobile terminal device within a network link to which the router device is connected; and a router processing unit configured to deliver arrived packets destined to the global address of the mobile terminal device, to the mobile terminal device upon receiving a first message indicating a start of a utilization of the Internet service using the global address from the mobile terminal device, and discard arrived packets destined to the global address of the mobile terminal device upon receiving a second message indicating an end of the utilization of the Internet service using the global address from the mobile terminal device.

According to another aspect of the present invention there is provided a router device provided in a mobile communication network providing an Internet service, the router device comprising: a message processing unit configured to transmit a router message to be used in assigning a global address that is unique on Internet with respect to a mobile terminal device within a network link to which the router device is connected; and a router processing unit configured to deliver arrived packets destined to the global address of the mobile terminal device, to the mobile terminal device upon receiving a first message indicating a start of a utilization of the Internet service using the global address from the mobile terminal device, and discard a specific packet that satisfies a prescribed condition indicated by a second message among arrived packets destined to the global address of the mobile terminal device after receiving a second message from the mobile terminal device, the second message indicating a desire for not receiving delivery to the mobile terminal device of the specific packet that is destined to the global address of the mobile terminal device and the prescribed condition to be satisfied by the specific packet.

According to another aspect of the present invention there is provided a computer program product for causing a computer to function as a mobile terminal device, the computer program product comprising: first computer program codes for causing the computer to make access to a mobile communication network; second computer program codes for causing the computer to set up a global address that is unique on Internet and that should be used by the mobile terminal device in packet communications utilizing an Internet service provided by the mobile communication network, according to a message received from a nearest neighbor router device in the mobile communication network; and third computer program codes for causing the computer to carry out the packet communications utilizing the Internet service, notify a first message indicating a start of a utilization of the Internet service using the global address to the nearest neighbor router device at a time of starting the utilization of the Internet service using the global address, and notify a second message indicating an end of the utilization of the Internet service using the global address to the nearest neighbor router device at a time of ending the utilization of the Internet service using the global address.

According to another aspect of the present invention there is provided a computer program product for causing a computer to function as a mobile terminal device, the computer program product comprising: first computer program codes for causing the computer to make access to a mobile communication network: second computer program codes for causing the computer to set up a global address that is unique on Internet and that should be used by the mobile terminal device in packet communications utilizing an Internet service provided by the mobile communication network, according to a message received from a nearest neighbor router device in the mobile communication network; and third computer program codes for causing the computer to carry out the packet communications utilizing the Internet service, notify a first message indicating a start of a utilization of the Internet service using the global address to the nearest neighbor router device at a time of starting the utilization of the Internet service using the global address, and notify a second message to the nearest neighbor router device, when delivery to the mobile terminal device of a specific packet that is destined to the global address of the mobile terminal device and that has been delivered from the nearest neighbor router device is not desired, the second message indicating a desire for not receiving the delivery of the specific packet to the mobile terminal device and a prescribed condition to be satisfied by the specific packet.

According to another aspect of the present invention there is provided a computer program product for causing a computer to function as a router device provided in a mobile communication network providing an Internet service, the computer program product comprising: first computer program codes for causing the computer to transmit a router message to be used in assigning a global address that is unique on Internet with respect to a mobile terminal device within a network link to which the router device is connected; and second computer program codes for causing the computer to deliver arrived packets destined to the global address of the mobile terminal device, to the mobile terminal device upon receiving a first message indicating a start of a utilization of the Internet service using the global address from the mobile terminal device, and discard arrived packets destined to the global address of the mobile terminal device upon receiving a second message indicating an end of the utilization of the Internet service using the global address from the mobile terminal device.

According to another aspect of the present invention there is provided a computer program product for causing a computer to function a router device provided in a mobile communication network providing an Internet service, the computer program product comprising; first computer program codes for causing the computer to transmit a router message to be used in assigning a global address that is unique on Internet with respect to a mobile terminal device within a network link to which the router device is connected; and second computer program codes for causing the computer to deliver arrived packets destined to the global address of the mobile terminal device, to the mobile terminal device upon receiving a first message indicating a start of a utilization of the Internet service using the global address from the mobile terminal device, and discard a specific packet that satisfies a prescribed condition indicated by a second message among arrived packets destined to the global address of the mobile terminal device after receiving a second message from the mobile terminal device, the second message indicating a desire for not receiving delivery to the mobile terminal device of the specific packet that is destined to the global address of the mobile terminal device and the prescribed condition to be satisfied by the specific packet.

Other features and advantages of the present invention will become apparent from the following description taken in conjunction with the accompanying drawings.

BRIEF DESCRIPTION OF THE DRAWINGS

FIG. 13 is a flow chart showing another exemplary processing procedure of a router device at a time of permitting delivery of specific packets to a mobile terminal device by the procedure of FIG. 11.

DETAILED DESCRIPTION OF THE INVENTION

Referring now to FIG. 1 to FIG. 13, one embodiment of a communication system according to the present invention will be described in detail.

Figure 1:
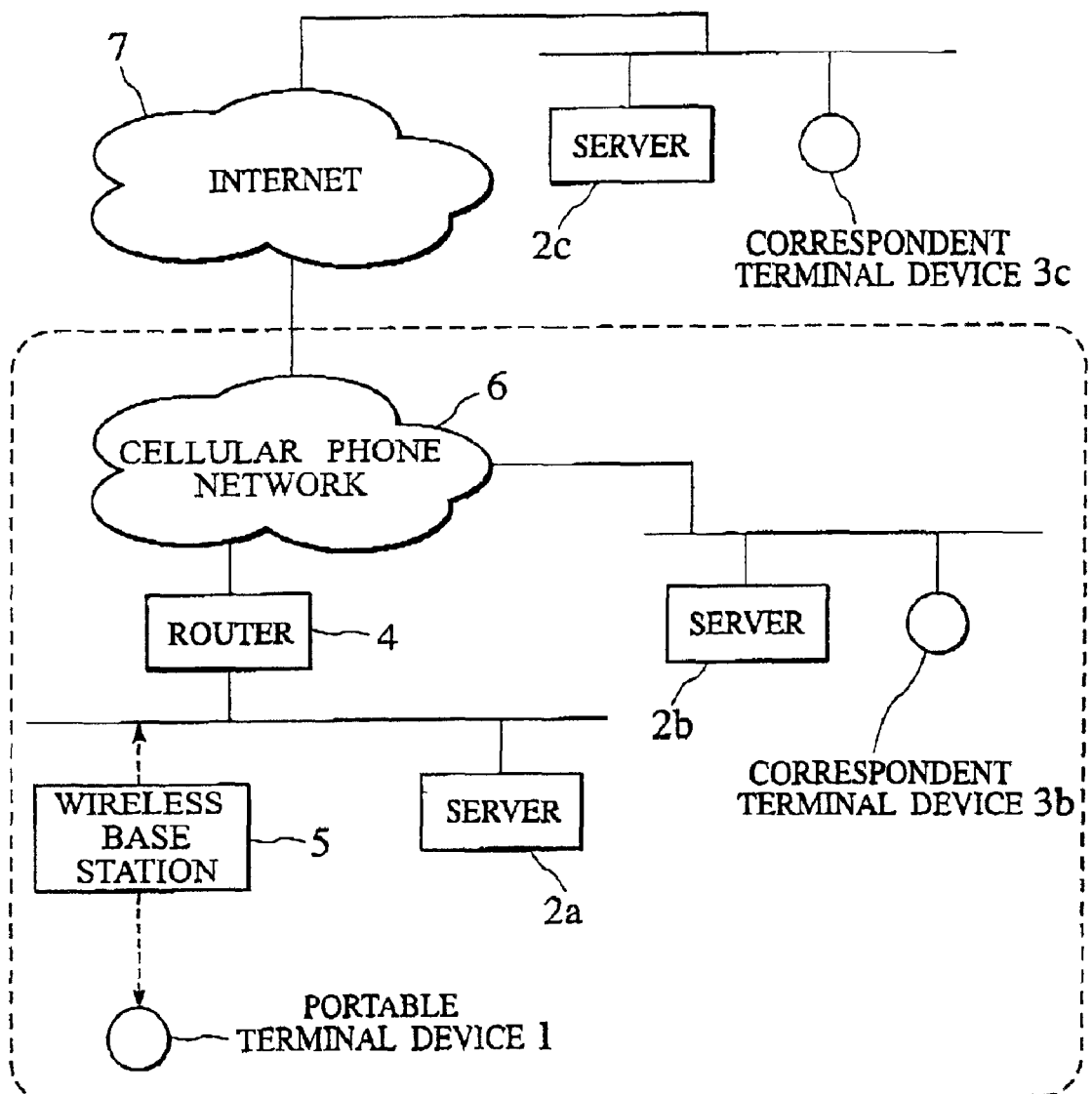
FIG. 1 is a block diagram showing an exemplary configuration of a communication system according to one embodiment of the present invention.

FIG. 1 shows an exemplary configuration of a communication system according to this embodiment.

In FIG. 1, a region enclosed by a dashed line 12 corresponds to a mobile carrier network portion. In the mobile carrier network 12, a plurality of network links are connected through a cellular phone network 6 and router devices 4. The mobile carrier network 12 is assumed to be originally providing the ordinary voice communication service, but a configuration for providing the ordinary voice communication service is omitted in FIG. 1.

Note that this embodiment is directed to the exemplary case where one mobile carrier manages its own packet communication network as a single management domain, but there can also be cases where one mobile carrier has a plurality of management domains, cases where a plurality of mobile carriers have a single common management domain, and any combination of these cases.

The mobile terminal device 1 (such as a portable terminal or a portable telephone, for example) will be connected to the corresponding network link through a wireless base stations corresponding to a geographic location of the mobile terminal device 1. Then, the mobile terminal device 1 becomes capable of carrying out packet communications with a node located within the same network link, a node within the same management domain through the router device 4, or a node located outside the management domain through the router device 4 and the Internet 7.

Here, the case where the mobile terminal device 1 carries out communications with correspondents (such as server devices 2a, 2b and 2c or correspondent terminal devices (other mobile terminal devices, for example) 3b and 3c) will be described. In this case, the relative positional relationship on the network between the mobile terminal device 1 and the correspondent can be any one of the following three cases:

(1) a positional relationship of the case where the correspondent is connected to the same network link as the mobile terminal device 1;

(2) a positional relationship of the case where the correspondent is connected to a network link which is different from that of the mobile terminal device 1 and which is contained within the same management domain as the mobile terminal device 1; and (3) a positional relationship of the case where the correspondent is not connected to a network link that is contained in the same management domain as the mobile terminal device 1, that is, the correspondent is connected to the general Internet different from the network links of the above two cases.

In the example of FIG. 1, the server device 2a corresponds to the positional relationship (1), the server device 2b and the correspondent terminal device 3b correspond to the positional relationship (2), and the server device 2c and the correspondent terminal device 3c correspond to the positional relationship (3).

These three types of the positional relationship are in correspondence to the concept called "address scope" defined in the IPv6. In the IPv6, the following three address scopes are defined (see RFC 2373 for further details).

(1) Link Local Address

This is an address valid only within the same network link, which has a prefix of 1111 1110 10 in the IPv6.

(2) Site Local Address

This is an address valid only within the same management domain, which has a prefix of 1111 1110 11 in the IPv6.

(3) Global Address

This is an address which is unique over the entire Internet.

Namely, in the example of FIG. 1, the mobile terminal device 1 can carry out communications using (arbitrary address containing) the link local address with respect to the server device 2a which is located on the same network link as the mobile terminal device 1, and communications using a site local address (or a global address) with respect to a server device 2b which is located in the same management domain as the mobile terminal device 1. On the other hand, the mobile terminal device 1 will carry out communications using a global address with respect to the server device 2c which is located on the general Internet 7.

In this embodiment, the packet transfer with respect to the mobile terminal device 1 will be controlled by using this address scope function.

Figure 2:
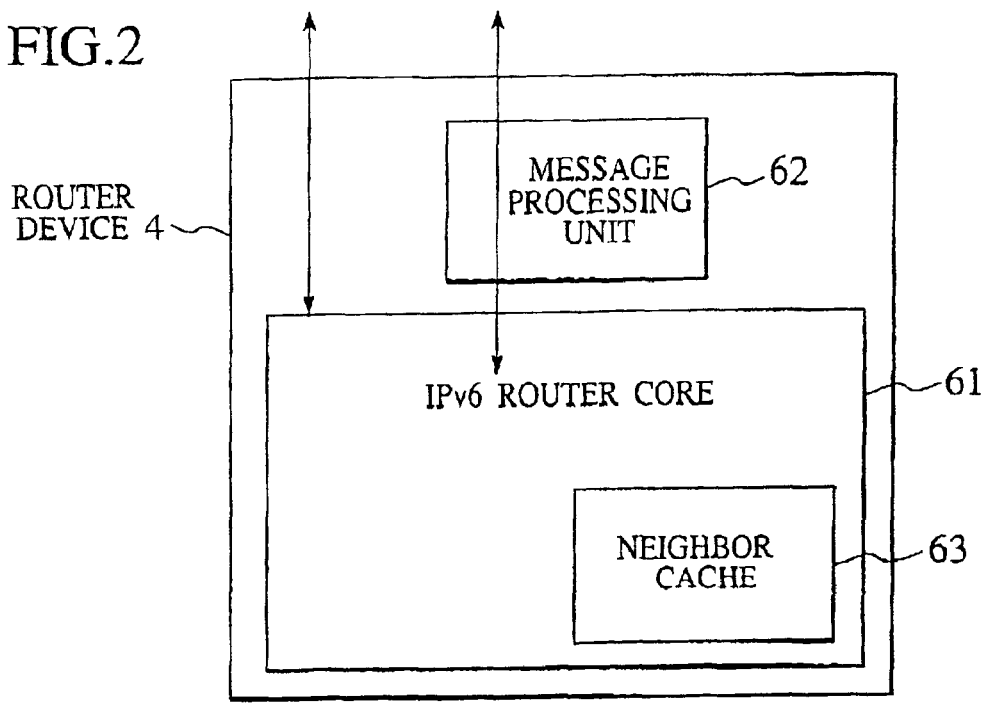
FIG. 2 is a block diagram showing an exemplary configuration of a router device in the communication system of FIG. 1.

FIG. 2 shows an exemplary configuration of the router device 4 in this embodiment.

This router device 4 has basic functions similar to those of an ordinary router compatible with the IPv6 provided by an IPv6 router core 61, but also has an additional function provided by a message processing unit 62 for processing messages transmitted from the mobile terminal device 1 such as an address information notification message and a neighbor cache entry deletion message.

The message processing unit 62 analyzes the received message, and when the received message is the address information notification message, the message processing unit 62 creates an entry corresponding to that mobile terminal device 1 (for indicating information on a correspondence between the global address of that mobile terminal device 1 and the MAC address on a link) in a neighbor cache 63 (which corresponds to the ARP table of the IPv4), whereas when the received message is the neighbor cache entry deletion message, the message processing unit 62 invalidates an entry corresponding to that mobile terminal device 1 in the neighbor cache 63.

Figure 3:
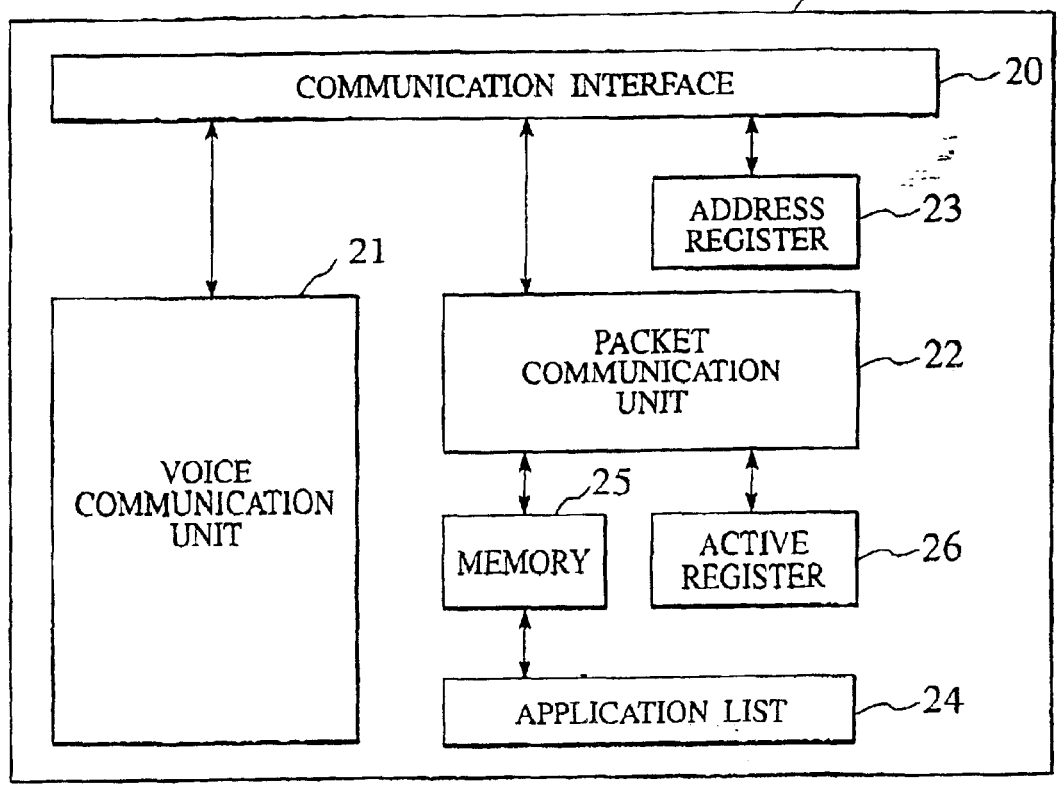
FIG. 3 is a block diagram showing an exemplary configuration of a mobile terminal device in the communication system of FIG. 1.

FIG. 3 shows an exemplary configuration of the mobile terminal device 1 in this embodiment.

As shown in FIG. 3, this mobile terminal device 1 comprises a communication interface 20, a voice communication unit 21 for carrying out ordinary voice communications, a packet communication unit 22 for carrying out packet communications according to the IPv6, an address register 23, an application list 24, a memory 25 and an active register 26.

The mobile terminal device 1 is capable of relating a plurality of IPv6 addresses with respect to one communication interface (capable of sending packets by using a plurality of IPv6 addresses from the same communication interface). The address register 23 is used for the purpose of storing these addresses.

A various IPv6 applications are to be operated on the mobile terminal device 1 side, and an application list 24 is used for storing a list of these applications (which includes information for identifying each application (a file name, for example) and an application type of each application or a protocol type, for example).

Also, when the specific application is activated by the user, the application is operated on the memory 25, while the active register 27 registers information regarding the currently operated application.

The communication interface 20 of this mobile terminal device 1 can be always assigned with one or both of the link local address and the site local address. The link local address and the site local address will be derived from the prefix defined in the IPv6 and the device ID of this mobile terminal device 1. Note that it is also possible for the communication service provider to assign arbitrary address as an address to be used in the same network link. Also, which one of the link local address alone, the site local address alone, and both the link local address and the site local address is to be always assigned can be determined according to the policy of the communication service provider.

In this way, the mobile terminal device 1 becomes always capable of utilizing (carrying out communications for) on-link services using (arbitrary address containing) the link local address (such as the advertisement delivery from a specific wireless base station group, for example), and/or services within domain which are services of the service provider in this embodiment (such as information service limited to the users of that service provider, for example).

On the other hand, the global address to be assigned will be generated from a network prefix delivered from the nearest neighbor router device 4 and the ID information (EUI-64) of the mobile terminal device 1, according to the "Stateless Address Autoconfiguration" (RFC 2461) defined in the IPv6.

The basic procedure for the global address generation is as follows. Namely, the router device 4 regularly broadcasts a router advertisement message on-link, or the router device 4 returns a response message upon receiving an inquiry message, and the mobile terminal device 1 receives the router advertisement message, or sends an inquiry message and receives the response message, generates the global address by using the network prefix contained in the received message, and transmits an address information notification message containing the generated IPv6 address and a MAC address to the router device 4 side. Upon receiving the address information notification message, the router device 4 makes an entry of a corresponding information into the corresponding neighbor cache 63. As a result, the nearest neighbor router device 4 will carry out the delivery of packets destined to the mobile terminal device 1.

Note that the user may be allowed to freely carry out the acquisition, setting and starting of the use of the IPv6 global address, or the discarding, setting and ending of the use of the IPv6 global address. However, in this embodiment, it is assumed that the processing for starting the use of the global address is carried out when the user of the mobile terminal device 1 activates an application that requires the global address, and the processing for ending the use of that global address is carried out when that application is terminated. In practice, not necessarily all of the applications that can be activated on the mobile terminal device 1 will make accesses requiring global addresses, so that the presence/absence of the use of the global address is registered for each application in the application list 24, and the processing will be carried out only in relation to the activation or the termination of the application that requires the global address.

First, the processing at a time of starting the use of the global address will be described.

Figure 4:
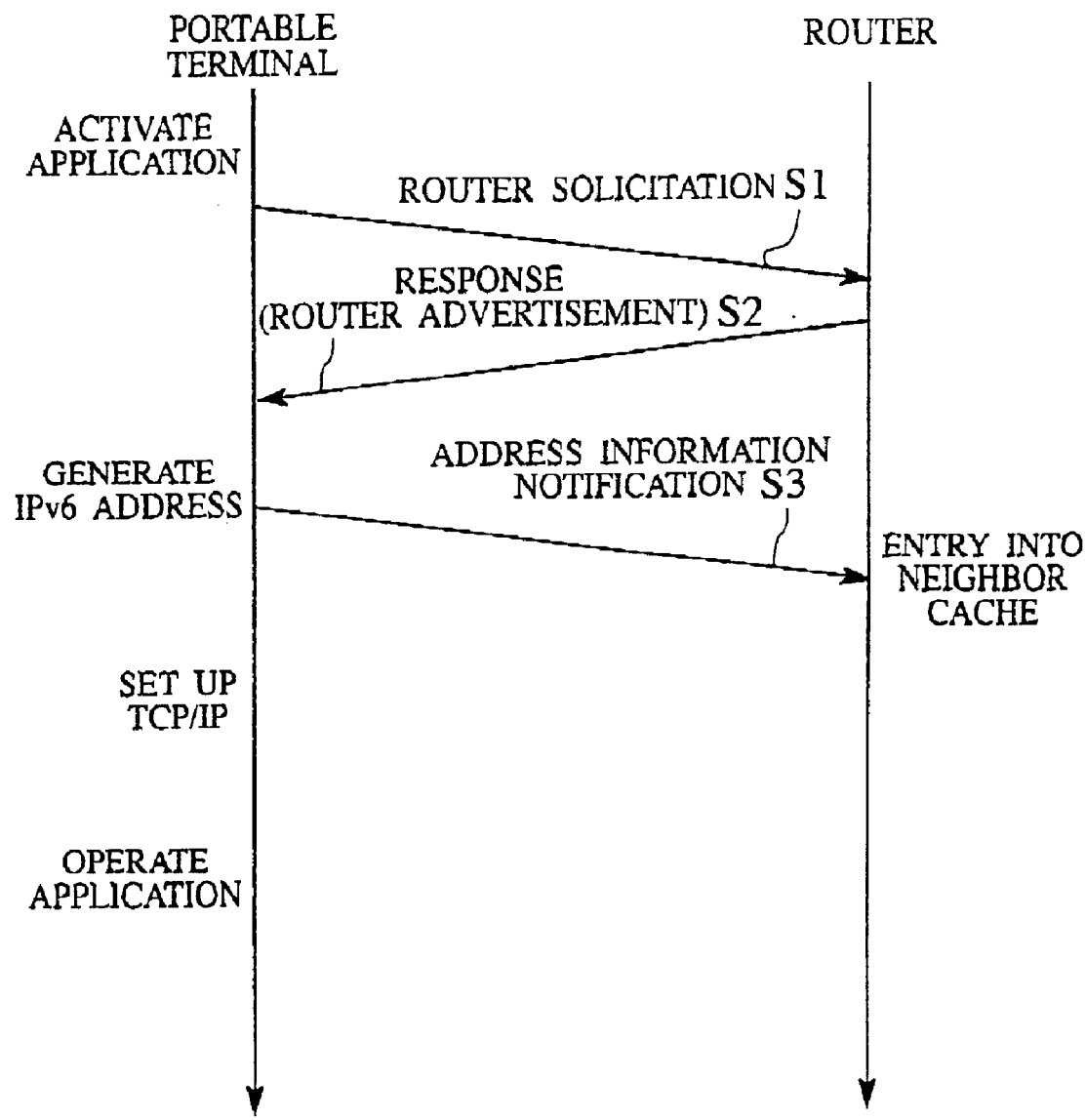
FIG. 4 is a sequence chart showing an exemplary procedure at a time of starting the use of a global address in the communication system of FIG. 1.
Figure 5:
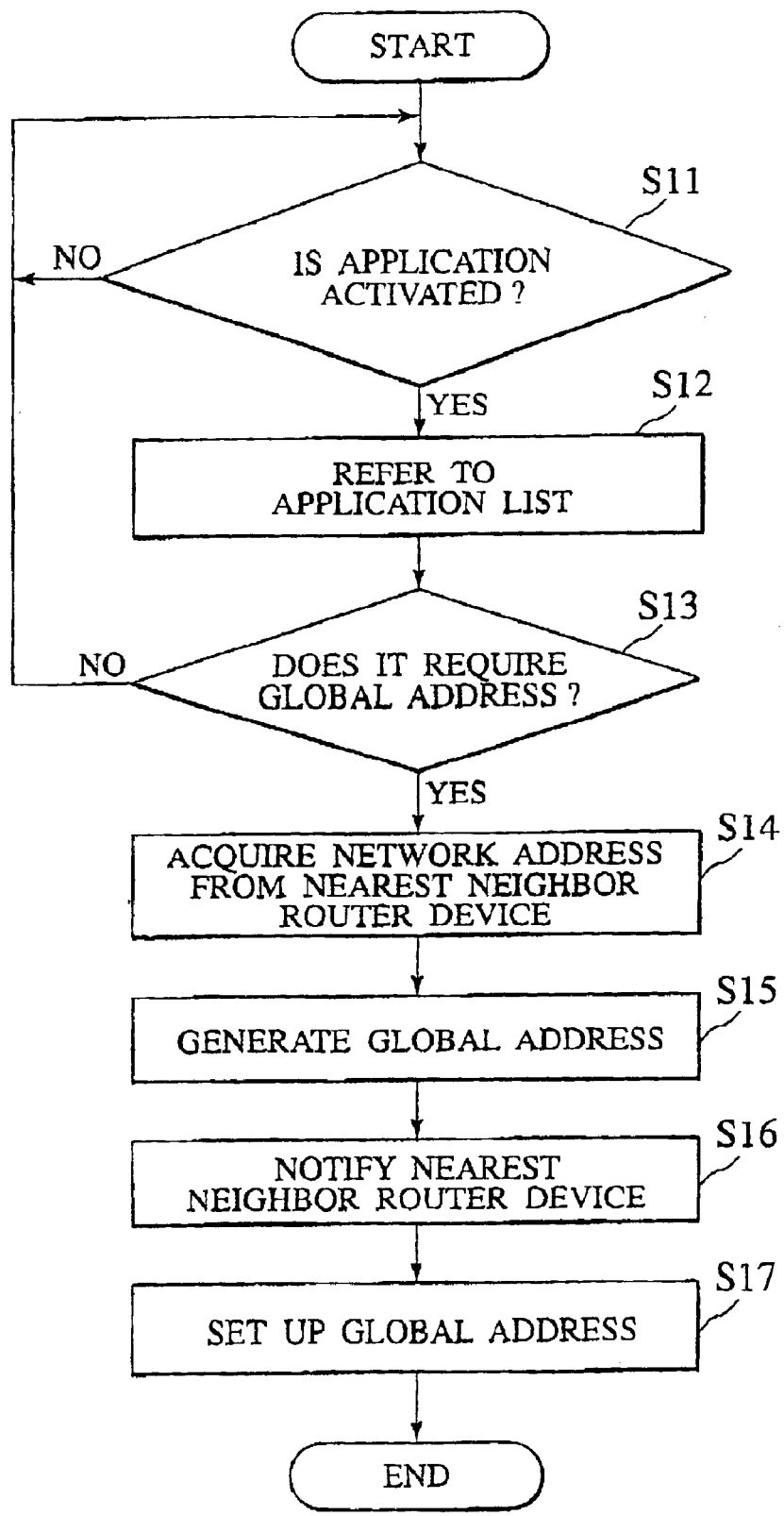
FIG. 5 is a flow chart showing an exemplary processing procedure of a mobile terminal device at a time of starting the use of a global address by the procedure of FIG. 4.

FIG. 4 shows an exemplary processing sequence at a time of starting the use of the global address, and FIG. 5 shows an exemplary processing procedure of the mobile terminal device 1 in this case.

First, at the mobile terminal device 1, the application that requires the global address is activated by the user.

When the application is activated (step S11 YES), the mobile terminal device 1 refers to the information registered in the application list 24 (such as an application type or a protocol type, for example) (step S12), and judges whether the activated application is one that requires the global address or not (step S13). When the activated application is one that requires the global address (step S13 YES), and acquires a network address from the nearest neighbor router device (step S14).

Here, the mobile terminal device 1 transmits a router solicitation message (step S1), and in response a response message (router advertisement message) is returned from the router device 4 to the mobile terminal device 1 (step S2).

Upon receiving the response message from the router device 4, the mobile terminal device 1 generates an IPv6 address by combining the network prefix contained in the response message with the device ID of the mobile terminal device 1 itself (step S15).

The mobile terminal device 1 transmits an address information notification message containing the generated IPv6 address and the MAC address to the router device 4 (step S3, step S16). Also, the mobile terminal device 1 makes a setting of its own TCP/IP module according to that IPv6 address (step S17), and then operates that application.

Note that, in the above, the mobile terminal device 1 acquires the network address by transmitting the router solicitation message, but it is also possible for the mobile terminal device 1 to receive the router advertisement message of the router device 4 that is distributed on-link and store the network address into a register (not shown) in advance. In such a case, the procedure regarding the router solicitation message transmission and the response message reception can be skipped in FIG. 4.

Note also that, in the case where a plurality of applications can be activated on the mobile terminal device 1, it is possible to carry out the above described processing sequence when the activation of the application that requires the global address is detected first.

Next, the processing at a time of ending the use of the global address will be described.

Figure 6:
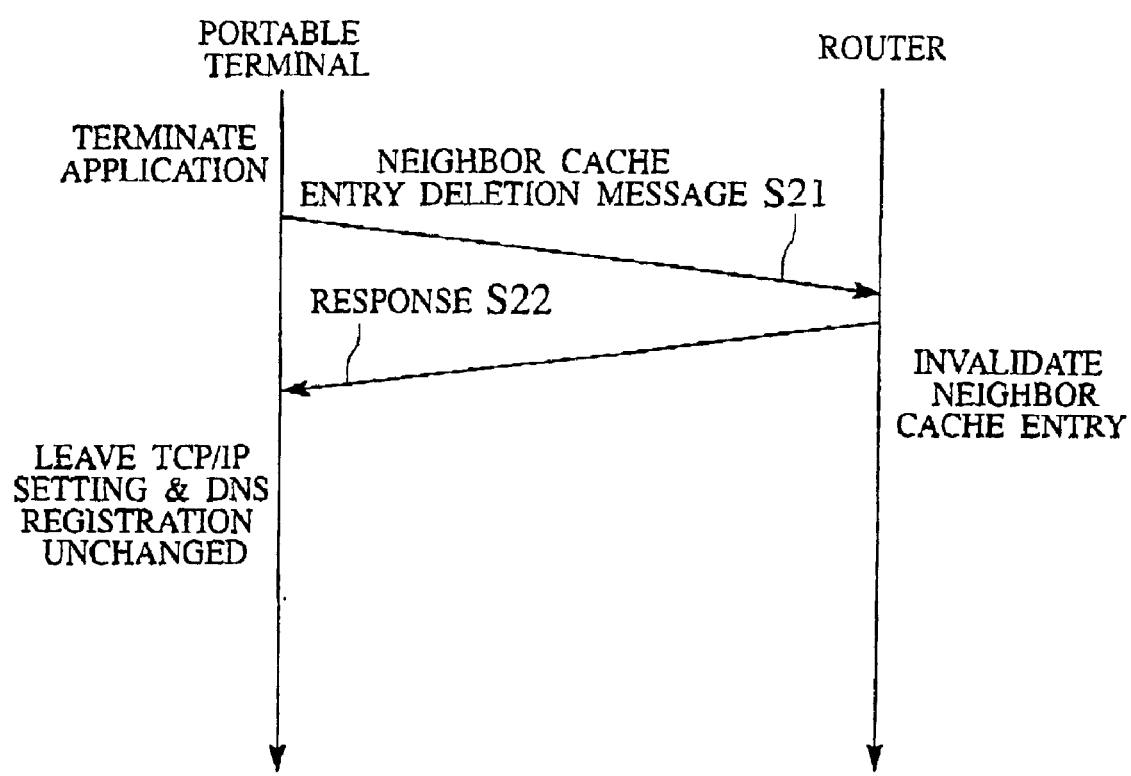
FIG. 6 is a sequence chart showing an exemplary procedure at a time of ending the use of a global address in the communication system of FIG. 1.
Figure 7:
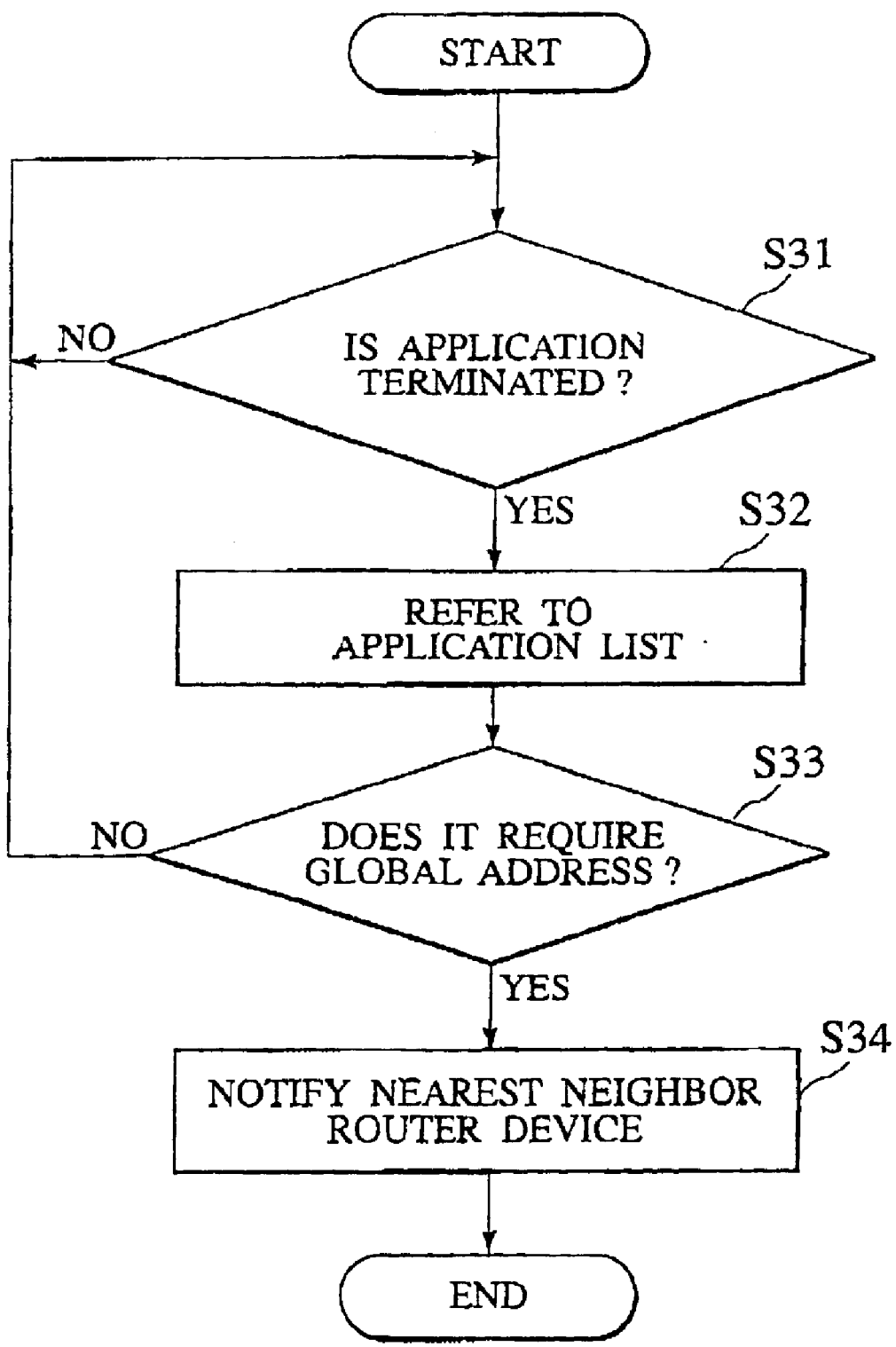
FIG. 7 is a flow chart showing an exemplary processing procedure of a mobile terminal device at a time of starting the use of a global address by the procedure of FIG. 6.

FIG. 6 shows an exemplary processing sequence at a time of ending the use of the global address, and FIG. 7 shows an exemplary processing procedure of the mobile terminal device 1 in this case.

First, at the mobile terminal device 1, the application that requires the global address is terminated by the user (or that application is forcefully terminated by the OS or the like).

When the termination of the application is detected by referring to the active register 26 (step S31 YES), the mobile terminal device 1 refers to the application list 24 (step S32) and judges whether the terminated application is one that requires the global address or not (step S33). When the terminal application is one that requires the global address (step S33 YES), the mobile terminal device 1 transmits a neighbor cache entry deletion message containing the IPv6 address and the MAC address to the nearest neighbor router device 4 (step S21, step S34).

Upon receiving the neighbor cache entry deletion message, the router device 4 deletes the entry of this mobile terminal device 1 from the neighbor cache 63, and returns a response message to the mobile terminal device 1 (step S22). In this way, even when a packet destined to the global address of this mobile terminal device 1 arrives from the internet 7 side, it is regarded as impossible to reach the destination at the router device 4 and processed as an error. From a viewpoint of an attacker on the Internet, this implies that even if an attack to send an enormous amount of packets using "ping" or the like is attempted by learning the global address of this mobile terminal device 1 somehow, all the packets will be processed as errors (discarded) by the nearest neighbor router device 4 so that the attack will fall.

Also, by sending the above described neighbor cache entry deletion message, there is no need to reset the global address setting on the mobile terminal device 1 side, and there is no need to delete the DNS entry corresponding to the mobile terminal device 1 on the Internet, because even if the others learn the global address of the mobile terminal device 1, it does not matter since the filtering by the router device 4 side is provided as described above. Also, by maintaining the global address setting in the mobile terminal device 1, there is an advantage that the set up can be made quicker at a time of activating the application next time (as long as the network ID remains unchanged).

Note that, in the case where a plurality of applications can be activated on the mobile terminal device 1, it is possible to carry out the above described processing sequence when the termination of all the applications that require the global address is detected first.

In the above, the global address is made available while the application that requires the global address is activated, but it is also possible to make the global address available while the application is activated regardless of whether the activated application is one that requires the global address or not.

Now, the above description is directed to the case where the neighbor cache entry itself in the router device 4 is to be deleted when the application that uses the global address is terminated at the mobile terminal device 1 side. This method presupposes the case where applications in which accesses to all the global address regions will be carried out by the initiative of the mobile terminal device 1 (such as WEB accesses), as well as applications in which packets destined to the mobile terminal device 1 will arrive from another node in terms of the global addresses such as VoIP that are increasingly used recently, will not be used after the use of the global address is ended.

For this reason, it is possible to use a method in which a passing permitted protocol specifying message, that contains an application type or a protocol type that should be used in those packets which are permitted to be transferred individually even after the general use of the global address is ended by the neighbor cache entry deletion message, is transmitted from the mobile terminal device 1 to the router device 4 and registers it at the router device 4 side in advance, in order to make it possible to utilize the above noted applications continuously even after the procedure for ending the use of the global address is carried out. In the following, the exemplary configuration for providing such a function will be described.

Figure 8:
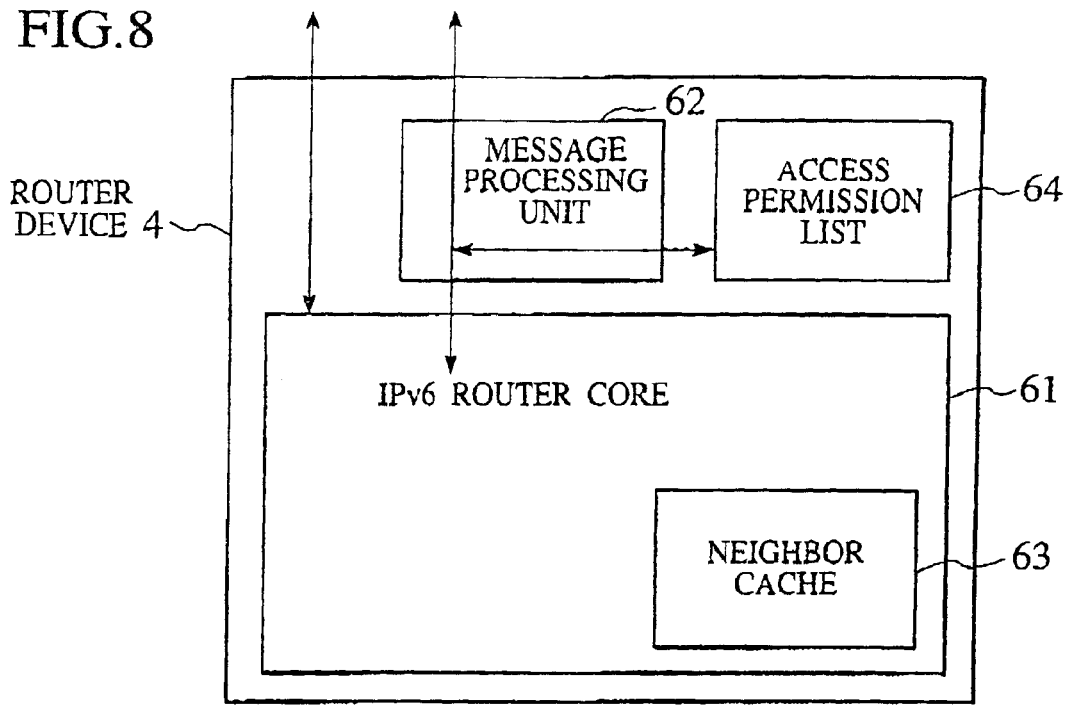
FIG. 8 is a block diagram showing another exemplary configuration of a router device in the communication system of FIG. 1.

FIG. 8 shows an exemplary configuration of the router device 4 in this case. This router device 4 differs from that of FIG. 2 in that an access permission list 64 to be defined for each mobile terminal device separately is added. When the received message is the passing permitted protocol specifying message, the message processing unit 62 makes an entry of the IPv6 global address of the corresponding mobile terminal device 1 and the protocol number for which the passing is to be permitted, into the access permission list 64.

Figure 9:
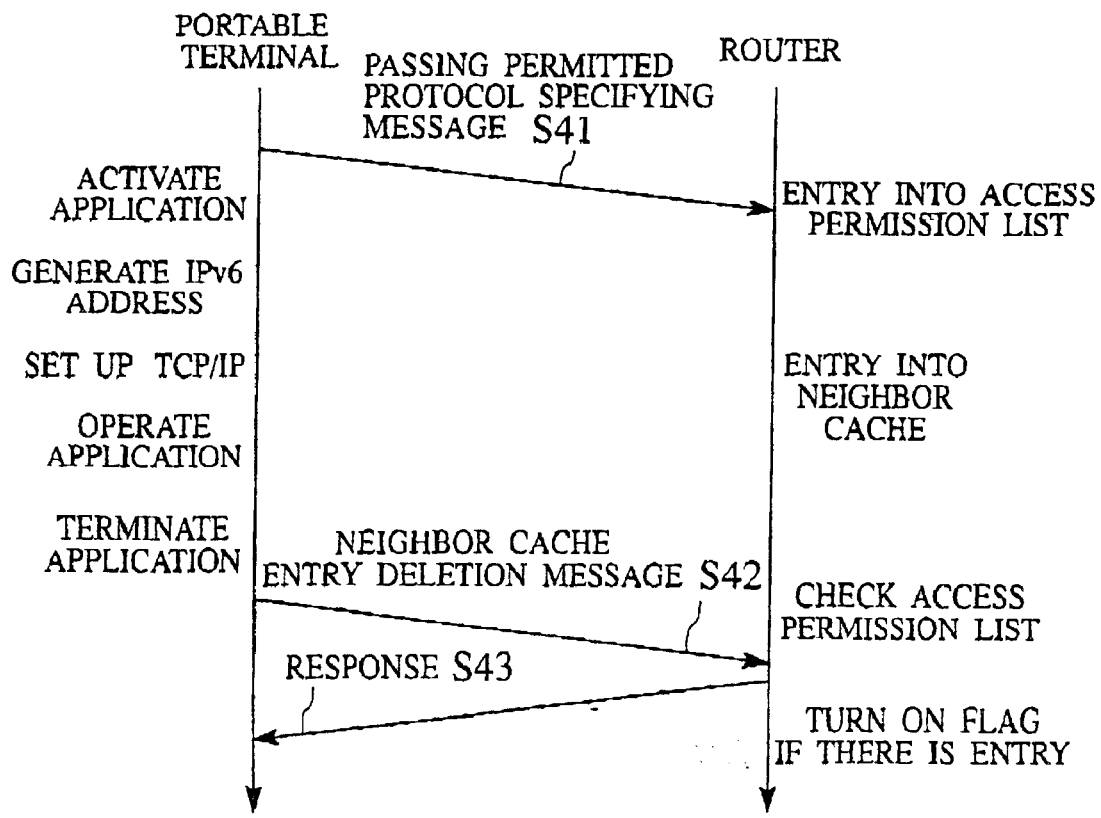
FIG. 9 is a sequence chart showing an exemplary procedure at a time of permitting delivery of specific packets to a mobile terminal device in the communication system of FIG. 1.

FIG. 9 shows an exemplary processing sequence in this case.

The mobile terminal device 1 constantly reads out the application type or protocol type that can possibly arrive, from the application list 24, and transmits the passing permitted protocol specifying message indicating this application type or protocol type and the global address of the mobile terminal device 1 itself in advance, at a prescribed timing (as a preliminary processing of the address acquisition of FIG. 4, for example) or at arbitrary timing since the activation of the mobile terminal device 1 until the transmission of the neighbor cache entry deletion message (step S41). Note that if the global address has not been generated yet at this timing, it will be generated by the procedure as described above.

Upon receiving the passing permitted protocol specifying message, the router device 4 makes an entry of the IPv6 global address of the corresponding terminal and the application type or protocol type for which the passing is to be permitted, into the access permission list 64.

Then, when the neighbor cache entry deletion message transmitted by the mobile terminal device 1 is received (step S42), the router device 4 checks whether an entry related to that mobile terminal device 1 is registered in the access permission list 64 or not first, without deleting the corresponding entry in the neighbor cache 63 immediately. If there is a related entry in the access permission list 64, a flag associated with the corresponding entry in the neighbor cache 63 is turned ON without checking the neighbor cache 63 itself. If there is no related entry in the access permission list 64, the corresponding entry in the neighbor cache 63 itself is cleared similarly as in the case of FIG. 6. Then, the router device 4 returns the response message to the mobile terminal device 1 (step S43).

After that, when a packet destined to the global address of the mobile terminal device 1 is transferred to the router device 4, the router device 4 determines whether this packet should be delivered or discarded, by referring to the neighbor cache entry, the flag associated with the neighbor cache entry, and the access permission list entry as follows, for example.

(1) When there is no neighbor cache entry, the packet is processed as error.

(2) When there is a neighbor cache entry but the flag is ON, the access permission list is checked, and if there is an entry matching with the destination address an and the application type or protocol type of the packet, the packet is delivered. Otherwise, the packet is processed as error.

(3) When there is a neighbor cache entry and the flag is ON, the packet is delivered immediately.

Figure 10:
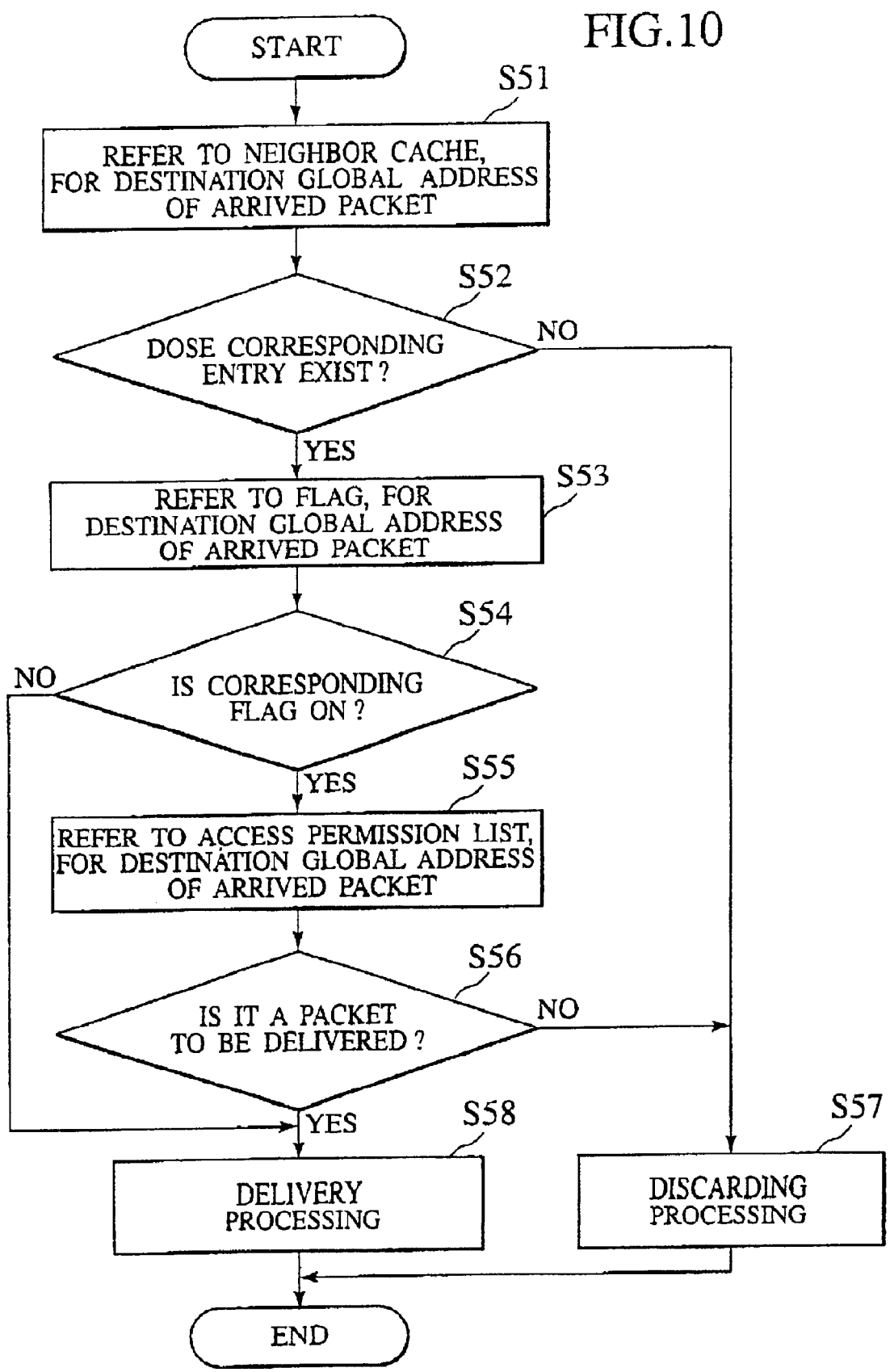
FIG. 10 is a flow chart showing an exemplary processing procedure of a router device at a time of permitting delivery of specific packets to a mobile terminal device by the procedure of FIG. 9.

FIG. 10 shows an exemplary processing procedure of the router device 4 in this case.

When a packet destined to the global address of the mobile terminal device 1 arrives, the router device 4 first refers to the neighbor cache 63, for the destination global address of the arrived packet (step S51), and if there is no corresponding entry (step S52 NO), this packet is processed as error and discarded (step S57).

If there is a corresponding entry (step S52 YES), the router device 4 refers to the flag associated with that entry (step S53), and if the flag is OFF (step S54 NO), this packet is delivered (step S58).

If the flag is ON (step S54 YES), the router device 4 refers to the access permission list 64, for the destination global address of the arrived packet (step S55), and if there is an entry matching with the destination address and the application type or protocol type of this packet and this packer satisfies a condition for delivery (step S56 YES), this packer is delivered (step S58). If there is no entry matching with the destination address and the application type or protocol type of this packet so that this packet does not satisfy a condition for delivery (step S56 NO), this packet is processed as error and discarded (step S57).

In this way, it is possible to permit only the arrival of packets corresponding to a specific protocol group, for example, even after the ending of the use of the global address.

The above described arrived packet processing according to the access permission list is an exemplary case in which the access permission list is registered from the mobile terminal device 1 to the router device 4 side in advance such that the control is carried out by the router device 4 side, but it is also possible to use a configuration in which the first arrived packet is transferred from the router device 4 to the mobile terminal device 1, whether or not to receive this packet is judged at the mobile terminal device 1 side, and whether or not to deliver packets is determined at this point. In the following, the exemplary configuration for providing such a function will be described.

Figure 11:
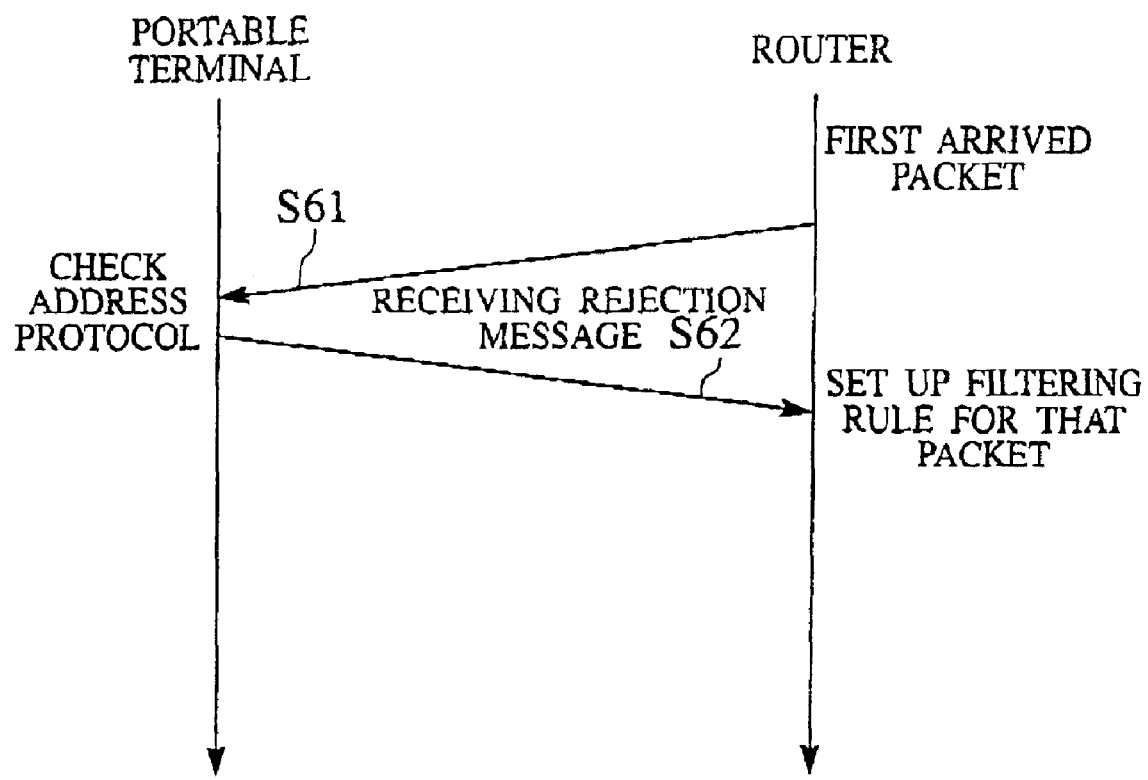
FIG. 11 is a sequence chart showing another exemplary procedure at a time of permitting delivery of specific packets to a mobile terminal device in the communication system of FIG. 1.

FIG. 11 shows an exemplary processing sequence in this case. In this case, the access permission list is to be provided at the mobile terminal device 1 side rather than the router device 4 side.

First, the mobile terminal device 1 generates a global address, and transmits the address information notification message containing the generated global address and the MAC address to the router device 4 in advance.

Then, the first arrived packet is delivered from the router device 4 to the mobile terminal device 1 side without any change.

Figure 12:
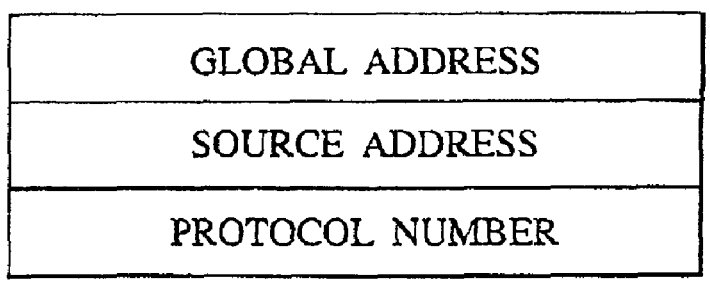
FIG. 12 is a diagram showing an exemplary message format for a receiving rejection message to be used at a time of permitting delivery of specific packets to a mobile terminal device by the procedure of FIG. 11.

At the mobile terminal 1 side, the source address and the protocol or the like of this packet are analyzed, and if it is a packet that should be received, the application is activated and communications are continued. If it is a packet to be rejected, the mobile terminal device 1 transmits a receiving rejection message which explicitly indicates the global address of the mobile terminal device 1, the source address, and the application type or protocol type, to the router device 4 (step S62). FIG. 12 shows an exemplary message format of the receiving rejection message that contains the global address, the source address and the protocol number.

Upon receiving the receiving rejection message, the router device 4 sets up an appropriate filtering rule (a rule to be satisfied by packets to be discarded: such as a rule that enumerates combinations of the global address, the source address, and the protocol type for packets to be discarded, for example), according to the content of the receiving rejection message. Thereafter, the router device 4 is controlled such that any packet that satisfies this rule will not be transferred to the mobile terminal device 1 side even if it arrives repeatedly.

FIG. 13 shows an exemplary processing procedure of the router device 4 in this case.

When a packet destined to the global address of the mobile terminal device 1 arrives, the router device 4 first refers to the neighbor cache 63, for the destination global address of the arrived packet (step S71), and if there is no corresponding entry (step S72 NO), this packet is processed as error and discarded (step S75).

If there is a corresponding entry (step S72 YES), the router device 4 refers to the filtering rule, for the destination global address of the arrived packet (step S73), and if this packer satisfies the filtering rule (step S74 YES), this packet is processed as error and discarded (step S75), whereas if this packet does not satisfy the filtering rule (step S74 NO), this packet is delivered (step S76).

Note that the mobile terminal device 1 may have any one or two or all three of the three types of functions (a function explained with reference to FIG. 4, a function explained with reference to FIG. 9, and a function explained with reference to FIG. 11) regarding the use of the global address and the delivery of the arrived packet described above. The same is also true for the router device 4.

Also, in the above, it is assumed that the mobile terminal device 1 has the ordinary voice communication function, but the mobile terminal device 1 may have communication functions for information in other forms such as text communications in addition to or instead of the ordinary voice communication function. The mobile terminal device 1 may be a device which is capable of utilizing only the Internet service. The similar modifications are also possible with respect to the services provided by the communication service provider, As described above, according to the present invention, the address assignment and the entry into the neighbor cache are carried out by each mobile terminal device only when communications using the global address are actually required by the application, so that attacking packets from the global Internet while communications using the global address are unnecessary can be filtered out, and thereby the security with respect to the user of the mobile terminal device can be improved. Also, even in a state after the ending of the use of the global address, it is possible to receive the information delivery in a limited area by using a link local address or the user service limited within the mobile carrier by using a site local address.

In the present invention, the mobile terminal device notifies a prescribed message to the nearest neighbor router device at a prescribed timing, and receives the Internet service using the global address that is unique over the entire Internet while the application that requires the global address is activated, whereas otherwise the delivery of packets at the nearest neighbor router device can be stopped, for example.

Also, even when the global address is not used, if there is a possibility for receiving the arriving service from the Internet (such as VoIP), this can be handled by controlling the nearest neighbor router device in such a way that, when a packet destined to the mobile terminal device is received, the protocol type or the like is checked and if it is a packet corresponding to the arriving service, this packet is delivered, or a security mechanism specific to the arriving service (such as attaching an authentication code) is requested and this packet is passed after checking by that security mechanism, for example.

Also, by making at least one of the link local address and the site local address always utilizable at the mobile terminal device, it becomes always possible to receive a service closed within the mobile carrier (such as a mail arrival notification) or the advertisement delivery carried out in each base station area independently.

According to the present invention, it becomes possible to carry out end-to-end communications whenever necessary while also preventing the unnecessary packet attacks from the global Internet, without significantly changing the framework of the conventional IPv6.

Thus according to the present invention, the arrived packets are delivered from the nearest neighbor router device to the mobile terminal device according to the need such as when a prescribed application is activated or when a prescribed packet has arrived, so that it is possible to prevent the unnecessary packet attacks from the global Internet.

Note that the present invention can be realized easily by adding only some messaging protocol to the existing IPv6 devices, and the conventional IPv6 addressing architecture can be used without any change. Consequently, it is advantageous in terms of the compatibility with the existing devices.

Note also that the present invention can be easily expanded according to the network management policies of the various mobile carriers. The present invention is also applicable not only to the IPv6 but also to the packet communications using the portable telephones that are proposed recently.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the mobile terminal device and the router device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet transfer method, comprising:

generating a global address that is unique on Internet at a mobile terminal device, the global address being an address which should be used by the mobile terminal device in utilizing an Internet service provided by a mobile communication network to which the mobile terminal device is connected, according to a message received from a nearest neighbor router device in the mobile communication network;

notifying a first message indicating a start of a utilization of the Internet service using the global address, from the mobile terminal device to the nearest neighbor router device at a time of starting the utilization of the Internet service using the global address;

delivering arrived packets destined to the global address of the mobile terminal device from the nearest neighbor router device to the mobile terminal device upon receiving the first message at the nearest neighbor router device;

notifying a second message indicating an end of the utilization of the Internet service using the global address from the mobile terminal device to the nearest neighbor router device at a time of ending the utilization of the Internet service using the global address; and discarding arrived packets destined to the global address of the mobile terminal device at the nearest neighbor router device upon receiving the second message at the nearest neighbor router device.

2. The packet transfer method of claim 1, further comprising:

notifying a third message from the mobile terminal device to the nearest neighbor router device before notifying the second message, when delivery to the mobile terminal device of specific packets that satisfy a prescribed condition, that are destined to the global address of the mobile terminal device and that will arrive at the nearest neighbor router device after the second message is notified to the nearest neighbor router device is desired, the third message indicating a desire for the delivery of the specific packets to the mobile terminal device and the prescribed condition to be satisfied by the specific packets; and delivering the specific packets that satisfy the prescribed condition indicated by the third message among arrived packets destined to the global address of the mobile terminal device from the nearest neighbor router device to the mobile terminal device and discarding any other arrived packets destined to the global address of the mobile terminal device at the nearest neighbor router device, after the second message is notified from the mobile terminal device upon receiving the third message from the mobile terminal device at the nearest neighbor router device.

3. A packet transfer method, comprising:

generating a global address that is unique on Internet at a mobile terminal device, the global address being an address which should be used by the mobile terminal device in utilizing an Internet service provided by a mobile communication network to which the mobile terminal device is connected, according to a message received from a nearest neighbor router device in the mobile communication network;

notifying a first message indicating a start of a utilization of the Internet service using the global address, from the mobile terminal device to the nearest neighbor router device at a time of starting the utilization of the Internet service using the global address;

delivering arrived packets destined to the global address of the mobile terminal device from the nearest neighbor router device to the mobile terminal device upon receiving the first message at the nearest neighbor router device;

notifying a second message from the mobile terminal device to the nearest neighbor router device, when delivery to the mobile terminal device of a specific packet that is destined to the global address of the mobile terminal device and that has been delivered from the nearest neighbor router device is not desired, the second message indicating a desire for not receiving the delivery of the specific packet to the mobile terminal device and a prescribed condition to be satisfied by the specific packet; and discarding the specific packet that satisfies the prescribed condition indicated by the second message among arrived packets destined to the global address of the mobile terminal device at the nearest neighbor router device after receiving the second message from the mobile terminal device at the nearest neighbor router device.

4. A mobile terminal device, comprising:

a communication interface configured to make access to a mobile communication network;

an address setting unit configured to set up a global address that is unique on Internet and that should be used by the mobile terminal device in packet communications utilizing an Internet service provided by the mobile communication network, according to a message received from a nearest neighbor router device in the mobile communication network; and a packet communication unit configured to carry out the packet communications utilizing the Internet service, notify a first message indicating a start of a utilization of the Internet service using the global address to the nearest neighbor router device at a time of starting the utilization of the Internet service using the global address, and notify a second message indicating an end of the utilization of the Internet service using the global address to the nearest neighbor router device at a time of ending the utilization of the Internet service using the global address.

5. The mobile terminal device of claim 4, wherein the packet communication unit notifies the first message when an application that requires the global address is activated, and notifies the second message when the application that requires the global address is terminated.

6. The mobile terminal device of claim 4, wherein the packet communication unit also notifies a third message to the nearest neighbor router device before notifying the second message, when delivery to the mobile terminal device of specific packets that satisfy a prescribed condition, that are destined to the global address of the mobile terminal device and that will arrive at the nearest neighbor router device after the second message is notified to the nearest neighbor router device is desired, the third message indicating a desire for the delivery of the specific packets to the mobile terminal device and the prescribed condition to be satisfied by the specific packets.

7. The mobile terminal device of claim 4, wherein the packet communication unit maintains an entry for the mobile terminal device already registered in a name server on the Internet at a time of notifying the second message to the nearest neighbor router device.

8. The mobile terminal device of claim 4, wherein the packet communication unit maintains data on the global address already set in a TCP/IP module operating on the mobile terminal device at a time of notifying the second message to the nearest neighbor router device.

9. The mobile terminal device of claim 4, wherein the address setting unit sets up the global address when an application that requires the global address is activated.

10. The mobile terminal device of claim 4, wherein the address setting unit sets up the global address according to a stateless address autoconfiguration as defined by IPv6.

11. The mobile terminal device of claim 4, wherein the address setting unit also sets up one or both of a link local address that is valid only within a network link in the mobile communication network to which mobile terminal device is connected, and a site local address that is valid only within a management domain containing the network link in the mobile communication network to which the mobile terminal device is connected, such that one or both of an Internet service using the link local address and an Internet service using the site local address are available to the packet communication unit.

12. A mobile terminal device, comprising:
a communication interface configured to make access to a mobile communication network;
an address setting unit configured to set up a global address that is unique on Internet and that should be used by the mobile terminal device in packet communications utilizing an Internet service provided by the mobile communication network, according to a message received from a nearest neighbor router device in the mobile communication network; and
a packet communication unit configured to carry out the packet communications utilizing the Internet service, notify a first message indicating a start of a utilization of the Internet service using the global address to the nearest neighbor router device at a time of starting the utilization of the Internet service using the global address, and notify a second message to the nearest neighbor router device, when delivery to the mobile terminal device of a specific packet that is destined to the global address of the mobile terminal device and that has been delivered from the nearest neighbor router device is not desired, the second message indicating a desire for not receiving the delivery of the specific packet to the mobile terminal device and a prescribed condition to be satisfied by the specific packet.

13. The mobile terminal device of claim 12, wherein the address setting unit sets up the global address when an application that requires the global address is activated.

14. The mobile terminal device of claim 12, wherein the address setting unit sets up the global address according to a stateless address autoconfiguration as defined by IPv6.

15. The mobile terminal device of claim 12, wherein the address setting unit also sets up one or both of a link local address that is valid only within a network link in the mobile communication network to which mobile terminal device is connected, and a site local address that is valid only within a management domain containing the network link in the mobile communication network to which the mobile terminal device is connected, such that one or both of an Internet service using the link local address and an Internet service using the site local address are available to the packet communication unit.

16. A router device provided in a mobile communication network providing an Internet service, the router device comprising:

a message processing unit configured to transmit a router message to be used in assigning a global address that is unique on Internet with respect to a mobile terminal device within a network link to which the router device is connected; and
a router processing unit configured to deliver arrived packets destined to the global address of the mobile terminal device, to the mobile terminal device upon receiving a first message indicating a start of a utilization of the Internet service using the global address from the mobile terminal device, and discard arrived packets destined to the global address of the mobile terminal device upon receiving a second message indicating an end of the utilization of the Internet service using the global address from the mobile terminal device.

17. The router device of claim 16, wherein the message processing unit is also configured to receive a third message from the mobile terminal device before receiving the second message, the third message indicating a desire for delivery to the mobile terminal device of specific packets that satisfy a prescribed condition, that are destined to the global address of the mobile terminal device and that will arrive at the router device after the second message is notified to the router device, and the prescribed condition to be satisfied by the specific packets; and
the router processing unit is also configured to deliver the specific packets that satisfy the prescribed condition indicated by the third message among arrived packets destined to the global address of the mobile terminal device, to the mobile terminal device, and discard any other arrived packets destined to the global address of the mobile terminal device, after the second message is notified from the mobile terminal device upon receiving the third message from the mobile terminal device.

18. The router device of claim 16, wherein the message processing unit is configured to transmit the router message regularly as a router advertisement message defined by IPv6, or individually as a response to a nearest neighbor router solicitation message from the mobile terminal device.

19. A router device provided in a mobile communication network providing an Internet service, the router device comprising:
a message processing unit configured to transmit a router message to be used in assigning a global address that is unique on Internet with respect to a mobile terminal device within a network link to which the router device is connected; and
a router processing unit configured to deliver arrived packets destined to the global address of the mobile terminal device, to the mobile terminal device upon receiving a first message indicating a start of a utilization of the Internet service using the global address from the mobile terminal device, and discard a specific packet that satisfies a prescribed condition indicated by a second message among arrived packets destined to the global address of the mobile terminal device after receiving a second message from the mobile terminal device, the second message indicating a desire for not receiving delivery to the mobile terminal device of the specific packet that is destined to the global address of the mobile terminal device and the prescribed condition to be satisfied by the specific packet.

20. The router device of claim 19, wherein the message processing unit is configured to transmit the router message regularly as a router advertisement message defined by IPv6, or individually as a response to a nearest neighbor router solicitation message from the mobile terminal device.

21. A computer program product for causing a computer to function as a mobile terminal device, the computer program product comprising:

first computer program codes for causing the computer to make access to a mobile communication network;

second computer program codes for causing the computer to set up a global address that is unique on Internet and that should be used by the mobile terminal device in packet communications utilizing an Internet service provided by the mobile communication network, according to a message received from a nearest neighbor router device in the mobile communication network; and third computer program codes for causing the computer to carry out the packet communications utilizing the Internet service, notify a first message indicating a start of a utilization of the Internet service using the global address to the nearest neighbor router device at a time of starting the utilization of the Internet service using the global address, and notify a second message indicating an end of the utilization of the Internet service using the global address to the nearest neighbor router device at a time of ending the utilization of the Internet service using the global address.

22. A computer program product for causing a computer to function as a mobile terminal device, the computer program product comprising:

first computer program codes for causing the computer to make access to a mobile communication network;

second computer program codes for causing the computer to set up a global address that is unique on Internet and that should be used by the mobile terminal device in packet communications utilizing an Internet service provided by the mobile communication network, according to a message received from a nearest neighbor router device in the mobile communication network; and third computer program codes for causing the computer to carry out the packet communications utilizing the Internet service, notify a first message indicating a start of a utilization of the Internet service using the global address to the nearest neighbor router device at a time of starting the utilization of the Internet service using the global address, and notify a second message to the nearest neighbor router device, when delivery to the mobile terminal device of a specific packet that is destined to the global address of the mobile terminal device and that has been delivered from the nearest neighbor router device is not desired, the second message indicating a desire for not receiving the delivery of the specific packet to the mobile terminal device and a prescribed condition to be satisfied by the specific packet.

23. A computer program product for causing a computer to function as a router device provided in a mobile communication network providing an Internet service, the computer program product comprising:

first computer program codes for causing the computer to transmit a router message to be used in assigning a global address that is unique on Internet with respect to a mobile terminal device within a network link to which the router device is connected; and second computer program codes for causing the computer to deliver arrived packets destined to the global address of the mobile terminal device, to the mobile terminal device upon receiving a first message indicating a start of a utilization of the Internet service using the global address from the mobile terminal device, and discard arrived packets destined to the global address of the mobile terminal device upon receiving a second message indicating an end of the utilization of the Internet service using the global address from the mobile terminal device.

24. A computer program product for causing a computer to function a router device provided in a mobile communication network providing an Internet service, the computer program product comprising:

first computer program codes for causing the computer to transmit a router message to be used in assigning a global address that is unique on Internet with respect to a mobile terminal device within a network link to which the router device is connected; and second computer program codes for causing the computer to deliver arrived packets destined to the global address of the mobile terminal device, to the mobile terminal device upon receiving a first message indicating a start of a utilization of the Internet service using the global address from the mobile terminal device, and discard a specific packet that satisfies a prescribed condition indicated by a second message among arrived packets destined to the global address of the mobile terminal device after receiving a second message from the mobile terminal device, the second message indicating a desire for not receiving delivery to the mobile terminal device of the specific packet that is destined to the global address of the mobile terminal device and the prescribed condition to be satisfied by the specific packet.

* * * * *